Figure 1:
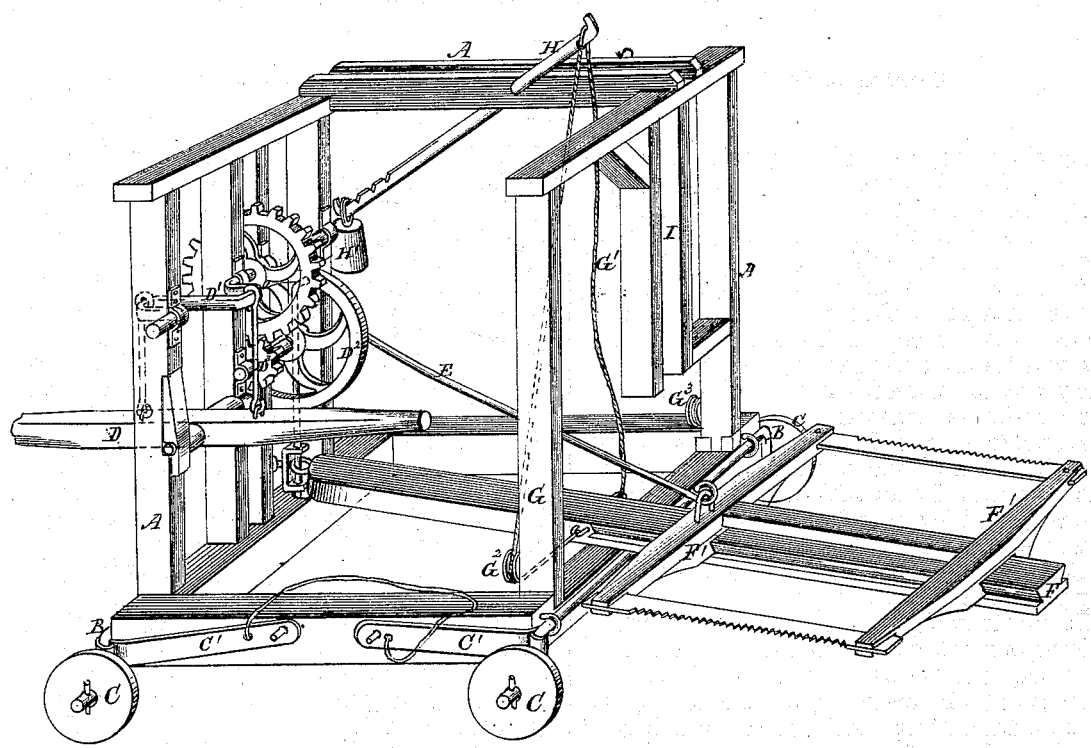

N. SCHAUMLOEFFEL & G. P. DAVIS.

Improvement in Sawing-Machines.

No. 127,106.  Patented May 21, 1872.

Witnesses.  Inventors

127,106

UNITED STATES PATENT OFFICE.

NICHOLAS SCHAUMLOEFFEL AND GEORGE P. DAVIS, OF MARTINSVILLE, NEW JERSEY.

IMPROVEMENT IN SAWING-MACHINES.

Specification forming part of Letters Patent No. 127,106, dated May 21, 1872.

Specification describing certain Improvements in Sawing-Machines, invented by NICHOLAS SCHAUMLOEFFEL and GEORGE P. DAVIS, both of Martinsville, in the county of Somerset and State of New Jersey.

Figure I is a perspective view of my improved machine, showing the wheels upon which it is moved, the frame-work, the gearing which drives the saw, a lever for moving the parts, the connecting-rod, and the reversible saw-frame, together with the weight, lever, and rope for feeding the saw horizontally; and Fig. II is a side elevation of the frame, the operating lever, the driving mechanism, the weighted lever, and of the saw-frame and saw, operating in a vertical position.

Corresponding letters refer to corresponding parts in both of the figures.

In constructing machines of this character it is important that they should be so arranged that they can be used for felling trees, and then have their saw so adjusted that they can be used for cutting the fallen tree into logs of any desired length; and my present invention consists in a machine the saw or saws of which may be used in either a horizontal or vertical position, and in certain combinations and arrangements as will be more fully described hereinafter.

In constructing this type of machines we use any suitable frame-work, A, the sills of which are of sufficient size and strength to support its upper portion, and at the same time to receive and hold the staples or boxes in which the cranked axles B B, which carry the wheels C C, are placed. These axles are so arranged upon the frame that one is at one end thereof and the other at the opposite end, the wheels being upon the outer ends, which are also supplied with levers, so that when said levers are turned to the position shown in Fig. 1, the wheels will rest upon the ground, or upon any track which may be provided for them to run upon, and the machine may readily be moved from place to place; but when they are turned to the position indicated in Fig. 2, the wheels will be raised, or the machine will be lowered, and the sills will rest firmly upon the ground or track upon which the machine may be standing, in which position they will be placed when the machine is in use. Rising from the sills of the frame are vertical posts, sufficient in number to support the caps which are placed upon them, and also to support the driving mechanism, which, in the example shown, consists of a lever, D, which is journaled in the posts of the frame, and has extending from it two connecting-rods, the upper ends of which are connected to a double-cranked axle, $D^1$, which also has its bearings in boxes secured to the posts of the frame. Upon this axle there is placed in the proper position a spur-wheel, which meshes into and drives a pinion, $D^3$, upon a short shaft placed below the one which carries the spur-wheel. Upon this short shaft there is placed a fly-wheel, $D^2$, into one of the arms of which a crank-pin is inserted, and to which a connecting-rod, E, is connected.

The parts above referred to constitute the driving mechanism; but it is evident that instead of the levers D being used and the machine being operated by hand, that a pulley may be placed upon the shaft $D^1$, and it driven by horse or other power; and also that the gear-wheels may be dispensed with, and pulleys be substituted, if desired.

The saw-frame F F' F' consists of a bar of wood or metal, the rear or inner end of which is supplied with a staple or box, which is made to move vertically upon a rod or guide attached to the vertical posts of the frame, so that it may be held in any desired position more or less elevated, by means of any suitable sleeve, having a set-screw passing through it for the purpose, and coming in contact with the rod, as shown in the drawing. Sliding upon the bar F of this frame there are two bars, F' F', the under surfaces of which are formed so as to fit into grooves in its edges, as shown in Fig. 1. This groove is of sufficient length to permit the bars F' F', a bar which runs parallel to the lever F, and which keeps them separated, and the saws, to move the required distance, such distance being controlled by the length of the crank in the arm of the fly-wheel, the connecting-rod E being connected to this frame for the purpose of giving it the required movement.

When the machine is to be used for felling trees, the saw-frame and its saws are to be placed in the position indicated in Fig. 1, at which time the levers F' F' and the saws are capable of having both a vibrating and swinging motion, the vibrating movement being caused by the rod E, and the swinging or feed movement being produced by the cords or chains G G$^1$, which are attached to the sides of the swinging bar F, as shown in Fig. 1, from which point they pass over sheaves G$^2$ or G$^3$, which are secured to the frame about on a line with a beam, and from thence they are carried upward to the short arm of a lever, H, the opposite or long arm of which is furnished with a weight, H′, so that when the saws are placed in position the weight shall cause them to be fed into the side of the tree upon their being put in motion.

When it is desirable to feed the saw to the right, the rope or chain is thrown off from the left-hand sheave, and the right will feed the saw in that direction. But when it is desirable to change its direction of feed the left-hand chain is put upon its sheave and the right-hand one thrown off, when the same weight and lever will give the required movement.

Figure 2:
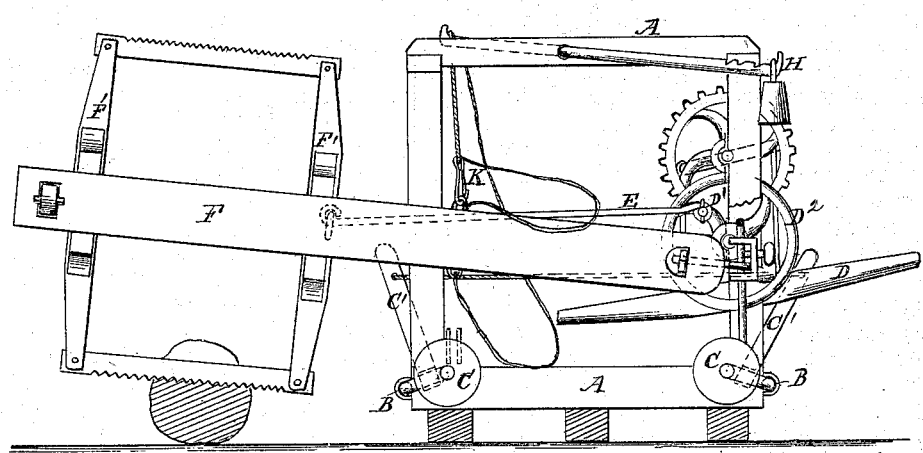

To change the machine into a vertical cutting one, it is only necessary to detach both of the ropes or chains from the sheaves, turn the saws and the bar F into the position shown in Fig. 2, pass it up into a guide slot, I, formed in the frame, and attach to the bar a hook, K, which is secured to a rope which is attached to the short arm of the lever H, and place the weight in the proper position on its opposite arm, and the vertical feed will thus be established.

It will be observed that in changing the position of the saw and the frame it is necessary that provision should be made for the change of position of the connecting-rod upon the crank-pin, and upon the pin or other device which secures it the frame of the same. This may be done by the use of staples, as shown in the saw-frame, or it may be by a jointed connecting-rod, secured together at or near its center, and so arranged that one of its ends may be turned to a right angle with the other.

Having thus described our invention, what we claim, and desire to secure by Letters Patent, is—

1. In a sawing-machine, arranged to cut both horizontally and vertically, the combination of the bar F, adjustable vertically at its rear end, frame F′ F′, and the saw or saws which it carries, the connecting-rod E, and crank D$^1$, the parts being constructed and arranged to operate substantially as and for the purpose set forth.

2. The combination of the saw-bar F, the ropes or chains G G$^1$, sheaves G$^2$ G$^3$, lever H, and weight H′, when the parts are arranged to feed the saws to the right or left, substantially as and for the purpose set forth.

In testimony whereof we have signed our names to this specification in the presence of two subscribing witnesses.

NICHOLAS SCHAUMLOEFFEL.
GEORGE P. DAVIS.

Witnesses:
D. P. HOLLOWAY,
JOS. R. EDSON.